United States Patent
Dooley

(10) Patent No.: US 12,428,500 B2
(45) Date of Patent: Sep. 30, 2025

(54) MULTI-REACTOR SYSTEM AND METHOD FOR PRODUCTION OF POLYETHYLENE AND ETHYLENE CO-POLYMERS

(71) Applicant: CHEVRON PHILLIPS CHEMICAL COMPANY LP, The Woodlands, TX (US)

(72) Inventor: Kenneth Alan Dooley, Porter, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 894 days.

(21) Appl. No.: 17/651,822

(22) Filed: Feb. 21, 2022

(65) Prior Publication Data

US 2022/0267481 A1    Aug. 25, 2022

Related U.S. Application Data

(60) Provisional application No. 63/152,453, filed on Feb. 23, 2021.

(51) Int. Cl.
*C08F 2/00* (2006.01)
*B01J 19/00* (2006.01)
*B01J 19/18* (2006.01)
*C08F 2/01* (2006.01)
*C08F 10/02* (2006.01)

(52) U.S. Cl.
CPC .......... *C08F 2/001* (2013.01); *B01J 19/0013* (2013.01); *B01J 19/1812* (2013.01); *C08F 2/01* (2013.01); *C08F 10/02* (2013.01)

(58) Field of Classification Search
USPC .............. 526/64, 65; 422/117, 134; 700/269
See application file for complete search history.

(56) References Cited

U.S. PATENT DOCUMENTS

| | | | |
|---|---|---|---|
| 3,756,996 A | 9/1973 | Dus | |
| 3,875,128 A | 4/1975 | Suzuki | |
| 4,123,600 A | 10/1978 | Kita | |
| 4,153,774 A * | 5/1979 | Boettcher | C08F 6/26 526/64 |
| 4,229,416 A * | 10/1980 | Donaldson | C08F 10/02 422/138 |
| 4,271,280 A | 6/1981 | Tomura | |
| 4,282,339 A | 8/1981 | Donaldson | |
| 4,607,086 A * | 8/1986 | Sutter | B01J 19/1862 526/66 |
| 7,741,415 B2 | 6/2010 | Conrad | |

(Continued)

FOREIGN PATENT DOCUMENTS

| | | |
|---|---|---|
| GB | 120812 A | 11/1918 |
| WO | 1997025601 A1 | 7/1997 |
| WO | 2021250054 A1 | 12/2021 |

OTHER PUBLICATIONS

Partial Search Report issued in corresponding PCT Application No. PCT/US2023/062615, mailed on May 24, 2023, 2 pp.

*Primary Examiner* — Fred M Teskin
(74) *Attorney, Agent, or Firm* — Eversheds Sutherland (US) LLP

(57) ABSTRACT

Multi-reactor systems for the production of low-density polyethylene (LDPE) polymers and copolymers, wherein a first reactor product stream has a total mass flow of from about 10% to about 80% of the total mass flow of the second reactor product stream, methods of using the same, and processes of monitoring the same.

40 Claims, 4 Drawing Sheets

(56) References Cited

U.S. PATENT DOCUMENTS

| | | |
|---|---|---|
| 7,863,386 B2 | 1/2011 | Oswald |
| 8,871,876 B2 | 10/2014 | Berbee |
| 2013/0274424 A1* | 10/2013 | Weiand .................. C08F 10/02 73/31.04 |

* cited by examiner

MULTI-REACTOR SYSTEM AND METHOD FOR PRODUCTION OF POLYETHYLENE AND ETHYLENE CO-POLYMERS

CROSS-REFERENCE TO RELATED APPLICATIONS

This application claims the benefit of U.S. Provisional Application No. 63/152,453 filed on Feb. 23, 2021, which is incorporated herein in its entirety by reference.

FIELD OF THE DISCLOSURE

This disclosure relates generally to polyolefin production with multiple polymerization reactors and, more particularly, to employing reactors in series.

BACKGROUND

This section is believed to be helpful in providing the reader with background information to facilitate a better understanding of the various aspects of the present disclosure. Accordingly, it should be understood that these statements are not to be read as admissions of prior art.

Polyolefins such as polyethylene, polypropylene, and their copolymers, are widely used for piping, retail and pharmaceutical packaging, food and beverage packaging, plastic bags, toys, carpeting, various industrial products, automobile components, appliances and other household items, and so forth. Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such as thermal stability, molecular weight, and chemical reactivity, typically determine what type of polyolefin is suitable.

To satisfy this demand, various processes exist by which olefins may be polymerized to form polyolefins. These processes attempt to provide polymer that exhibit certain melt, physical, rheological, and/or mechanical properties for specific commercial end uses. For example, properties that may be adjusted in the polymerization process can include density, melt index (MI), melt flow rate (MFR), comonomer content, molecular weight, crystallinity, and the like. Among other things, selection and control of the reaction conditions within the reactor, such as temperature, pressure, chemical concentrations, polymer production rate, catalyst type, and so forth, may affect the polymer properties. In addition, monomer, co-monomer, catalyst, initiators and the like can also influence the polymer properties.

However, there remains a need for improvements of polymerization processes in order to enhance reactor conversion rates and operability, lower production costs, improve product quality, increase operating flexibility and capability, and expand product variety and so on. In this aspect, small incremental improvements, such as in heat transfer and reduced fouling, can increase operability, product quality, and product variety. Such improvements can result in significant economic benefit, increased sales, larger market share, greater price margins and netback, and so forth.

SUMMARY

This disclosure provides generally for multi-reactor processes and systems for the production of low-density polyethylene (LDPE) polymers and copolymers, wherein a first reactor product stream has a total mass flow of from about 10% to about 80% of the total mass flow of the second reactor product stream. Methods of using the multi-reactor systems and processes of monitoring the same are also provided.

One aspect of the disclosure relates to a method for the production of a low-density polyethylene polymer including: adding a first ethylene-containing feed stream to a first autoclave reactor; polymerizing the first-ethylene-containing feed stream in the first autoclave reactor in the presence of a first initiator to create a first reactor product stream; transferring the first reactor product stream from the first autoclave reactor to a second autoclave reactor; adding a second ethylene-containing feed stream to the second autoclave reactor; polymerizing the first reactor product stream and the second ethylene-containing feed stream in the presence of a second initiator to produce a second reactor product stream comprising a low-density polyethylene polymer; wherein the first reactor product stream has a total mass flow that is about 10% to about 80% of the total mass flow of the second reactor product stream.

Another aspect of the disclosure relates to a method for the production of a low-density polyethylene polymer including: adding a first ethylene-containing feed stream to a first tubular reactor; polymerizing the first-ethylene-containing feed stream in the first tubular reactor in the presence of a first initiator to create a first reactor product stream; transferring the first reactor product stream from the first tubular reactor to a second autoclave reactor; adding a second ethylene-containing feed stream to the second autoclave reactor; polymerizing the first reactor product stream and the second ethylene-containing feed stream in the presence of a second initiator to produce a second reactor product stream comprising a low-density polyethylene polymer; wherein the first reactor product stream has a total mass flow that is about 10% to about 80% of the total mass flow of the second reactor product stream.

Yet another aspect of the disclosure relates to a method for the production of a low-density polyethylene polymer including: adding a first ethylene-containing feed stream to a first autoclave reactor; polymerizing the first-ethylene-containing feed stream in the first autoclave reactor in the presence of a first initiator to create a first reactor product stream; transferring the first reactor product stream from the first autoclave reactor to a second tubular reactor; adding a second ethylene-containing feed stream to the second tubular reactor; polymerizing the first reactor product stream and the second ethylene-containing feed stream in the presence of a second initiator to produce a second reactor product stream comprising a low-density polyethylene polymer; wherein the first reactor product stream has a total mass flow that is about 10% to about 80% of the total mass flow of the second reactor product stream.

An aspect of the disclosure relates to a multi-reactor system for the production of low-density polyethylene polymers including: a first autoclave reactor configured to receive a first ethylene-containing feed stream and further configured to polymerize said ethylene-containing feed stream in the presence of a first initiator to create a first reactor product stream; a second autoclave reactor configured to receive the first reactor product stream and a second ethylene-containing feed stream and further configured to polymerize said first reactor product stream and second ethylene-containing feed stream in the presence of a second initiator to create a second reactor product stream comprising low-density polyethylene polymers; wherein the first autoclave reactor and the second autoclave reactor are configured such that the first reactor product stream has a total mass flow of from about 10% to about 80% of the total mass flow of the second reactor product stream.

Still another aspect of the disclosure relates to a multi-reactor system for the production of low-density polyethylene polymers including: a first tubular reactor configured to receive a first ethylene-containing feed stream and further configured to polymerize said ethylene-containing feed stream in the presence of a first initiator to create a first reactor product stream; a second autoclave reactor configured to receive the first reactor product stream and a second ethylene-containing feed stream and further configured to polymerize said first reactor product stream and second ethylene-containing feed stream in the presence of a second initiator to create a second reactor product stream comprising low-density polyethylene polymers; wherein the first tubular reactor and the second autoclave reactor are configured such that the first reactor product stream has a total mass flow of from about 10% to about 80% of the total mass flow of the second reactor product stream.

Yet another aspect of the present disclosure relates to a multi-reactor system for the production of low-density polyethylene polymers including: a first autoclave reactor configured to receive a first ethylene-containing feed stream and further configured to polymerize said ethylene-containing feed stream in the presence of a first initiator to create a first reactor product stream; a second tubular reactor configured to receive the first reactor product stream and a second ethylene-containing feed stream and further configured to polymerize said first reactor product stream and second ethylene-containing feed stream in the presence of a second initiator to create a second reactor product stream comprising low-density polyethylene polymers; wherein the first autoclave reactor and the second tubular reactor are configured such that the first reactor product stream has a total mass flow of from about 10% to about 80% of the total mass flow of the second reactor product stream.

A further aspect of the disclosure relates to a process for monitoring the polymerization of ethylene or ethylene and comonomers in the presence of a free-radical polymerization initiator at pressures from about 10,000 psi to about 50,000 psi and temperatures from about 320° F. to about 600° F. in a multi-reactor system, including the steps of: providing a multi-reactor system comprising a first autoclave reactor and a second autoclave reactor, wherein the inner volume of the first autoclave reactor is between about 30% and about 50% of the inner volume of the second autoclave reactor; measuring as process parameters the temperature profiles and the pressures of the reaction mediums and the flow and temperature profiles of the cooling mediums along each of the first and second autoclave reactors, monitoring the feeds of ethylene, comonomer, free-radical polymerization initiator, and chain-transfer agent to each of the first autoclave reactor and second autoclave reactor, calculating, based on process parameters and on a model for the polymerization process, concentrations for free-radical polymerization initiator, chain transfer agent, ethylene and comonomers at least so many positions along each the first autoclave reactor and the second autoclave reactor, that at least one calculation is carried out each 10 seconds for a volume unit flowing through the first autoclave reactor, calculating, based on the measured process parameters and the calculated concentrations, the cooling power, the generation of heat, and the concentration of radicals; calculating, based on the calculated data of the cooling power, of the generation of heat, and of the concentration of radicals, the potential of a thermal runaway of the reaction mixture at the positions along each of the first autoclave reactor and the second autoclave reactor which have the highest temperatures, and outputting an alarm signal if the calculated value for the potential of a thermal runaway in either the first or second autoclave reactor exceeds a predefined value.

Another aspect of the disclosure relates to a process for monitoring the polymerization of ethylene or ethylene and comonomers in the presence of a free-radical polymerization initiator at pressures from about 10,000 psi to about 50,000 psi and temperatures from about 320° F. to about 600° F. in a multi-reactor system, including the steps of: providing a multi-reactor system comprising a first tubular reactor and a second autoclave reactor, wherein the inner volume of the first tubular reactor is between about 30% and about 50% of the inner volume of the second autoclave reactor; measuring as process parameters the temperature profiles and the pressures of the reaction mediums and the flow and temperature profiles of the cooling mediums along each of the first tubular reactor and second autoclave reactor, monitoring the feeds of ethylene, comonomer, free-radical polymerization initiator, and chain-transfer agent to each of the first tubular reactor and second autoclave reactor, calculating, based on process parameters and on a model for the polymerization process, concentrations for free-radical polymerization initiator, chain transfer agent, ethylene and comonomers at least so many positions along each the first tubular reactor and the second autoclave reactor, that at least one calculation is carried out each 10 seconds for a volume unit flowing through the first tubular reactor, calculating, based on the measured process parameters and the calculated concentrations, the cooling power, the generation of heat, and the concentration of radicals; calculating, based on the calculated data of the cooling power, of the generation of heat, and of the concentration of radicals, the potential of a thermal runaway of the reaction mixture at the positions along each of the first tubular reactor and the second autoclave reactor which have the highest temperatures, and outputting an alarm signal if the calculated value for the potential of a thermal runaway in either the first tubular reactor or second autoclave reactor exceeds a predefined value.

Yet another aspect of the disclosure relates to a process for monitoring the polymerization of ethylene or ethylene and comonomers in the presence of a free-radical polymerization initiator at pressures from about 10,000 psi to about 50,000 psi and temperatures from about 320° F. to about 600° F. in a multi-reactor system, including the steps of: providing a multi-reactor system comprising a first autoclave reactor and a second tubular reactor, wherein the inner volume of the first autoclave reactor is between about 30% and about 50% of the inner volume of the second tubular reactor; measuring as process parameters the temperature profiles and the pressures of the reaction mediums and the flow and temperature profiles of the cooling mediums along each of the first autoclave reactor and second tubular reactor, monitoring the feeds of ethylene, comonomer, free-radical polymerization initiator, and chain-transfer agent to each of the first autoclave reactor and second tubular reactor, calculating, based on process parameters and on a model for the polymerization process, concentrations for free-radical polymerization initiator, chain transfer agent, ethylene and comonomers at least so many positions along each the first autoclave reactor and the second tubular reactor, that at least one calculation is carried out each 10 seconds for a volume unit flowing through the first autoclave reactor, calculating, based on the measured process parameters and the calculated concentrations, the cooling power, the generation of heat, and the concentration of radicals; calculating, based on the calculated data of the cooling power, of the generation of heat, and of the concentration of radicals, the potential of a thermal runaway of the reaction mixture at the positions along each of the first autoclave reactor and the second tubular reactor which have the highest temperatures, and outputting an alarm signal if the calculated value for the potential of a thermal runaway in either the first autoclave reactor or second tubular reactor exceeds a predefined value.

BRIEF DESCRIPTION OF THE DRAWINGS

Advantages of the methods, processes and systems of the present disclosure may become apparent to one of skill in the art upon reading the following detailed description and upon reference to the drawings in which.

DETAILED DESCRIPTION

Figure 1:
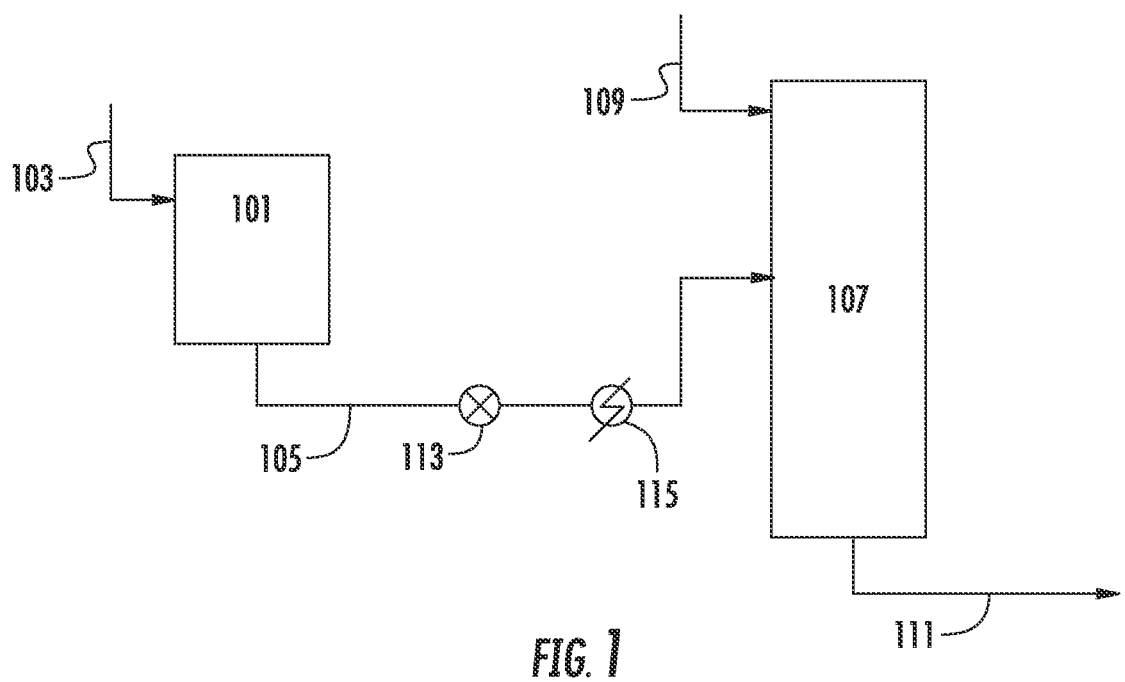
FIG. 1 is a simplified schematic of a multi-reactor system which can be used to produce a low-density polyethylene polymer according to disclosed embodiments.

One or more specific embodiments and/or aspects of the present disclosure are described herein. To provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill in the art and having the benefit of this disclosure.

Generally, polymerization reactors suitable for use in the production of LDPE polymers and copolymers may include high pressure autoclave and tubular reactors, as would be known to one of skill in the art. Autoclave reactors for use in the production of LDPE polymers and copolymers may be single-zone or multiple-zone reactors, and may have one or more sites for the introduction of ethylene and other monomers, catalysts, initiators, chain transfer agents, and the like. Autoclave reactors are typically operated at reactor pressures from about 1,000 bar to about 2,000 bar to produce LDPE polymers and copolymers. Autoclave reactors may also be used to produce LDPE copolymers where highly reactive comonomers (such as methyl acrylate, butyl acrylate, acrylic acid, and other acrylic comonomers) are employed, and autoclave reactors are capable of producing LDPE resins with a relatively high frequency of long-chain branching and broad molecular weight distributions. The high frequency of long chain branching and broad molecular weight distribution of LDPE polymers and copolymers produced in autoclave reactors provides desirable polymer characteristics which make the polymer easier to process in further steps, as would be readily understood by those of skill in the art. However, typical conventional commercial-scale autoclave reactors for producing LDPE polymers and copolymers operate at nearly adiabatic conditions. Thus, in typical autoclave reactors used to produce LDPE polymers and copolymers, the reactor conversion rate has typically been limited to a maximum of about 21% per pass.

Tubular reactors for use in the production of LDPE polymers and copolymers also may be single-zone or multiple-zone reactors, and may have one or more sites for the introduction of ethylene and other monomers, catalysts, initiators, chain transfer agents, and the like. Tubular reactors typically produce LDPE polymers and LDPE copolymers with narrower molecular weight distributions and a lower frequency of long-chain branching than autoclave reactors. Tubular reactors are typically operated from about 2,000 bar to about 3,100 bar to produce LDPE polymers and copolymers. As would be readily understood by those of skill in the art, tubular reactors are especially well-suited for producing LDPE polymers and copolymers with narrow molecular weight distributions, which are desirable for film type applications and for producing fractional melt index LDPE polymers and copolymers. However, LDPE polymers and copolymers produced in tubular reactors may not be suitable for use in extrusion coatings, because they give poor drawdown and high neck-in. Average fluid velocities in tubular reactors are generally more than 5 meters per second, for example 10 to 20 meters per second, which ensures fully turbulent flow throughout the length of the tubular reactor. In conventional or typical tubular reactors used to produce LDPE polymers and copolymers, the reactor conversion rate has typically been limited to a maximum of about 40% per pass.

Using either autoclave or tubular reactors, the LDPE or LDPE copolymer typically exits the reactor as a melt, where it is extruded and pelletized through a pelletizing extruder to produce a finished polymer product through methods well known in the art.

In some circumstances, to increase capacity of a polyolefin polymerization line or to achieve certain desired polymer characteristics, more than one polymerization reactor may be employed, with each reactor having its own set of conditions. In certain examples, the reactors may be connected in series, such that the discharge from one reactor may be transferred to a subsequent reactor, and so forth, until a polyolefin polymer is produced discharging from the final or terminal reactor with the desired set of characteristics. The respective reactor conditions including the polymerization recipe can be set and maintained such that the polyolefin (e.g., polyethylene, polypropylene) polymer product is monomodal, bimodal, or multimodal, and having polyolefin portions of different densities, and so on. Specifically, systems and methods of producing LDPE polymers using a tubular reactor operated in series with an upstream autoclave reactor, or using two similarly-sized autoclaves operated in series with one another are described in U.S. Pat. Nos. 4,282,339; 4,123,600; and 4,271,280.

Embodiments of the present disclosure relate to systems and methods for the production of low-density polyethylene (LDPE) polymers and LDPE copolymers in polymerization reactors in series, as well as methods of monitoring the same. Further embodiments of the present disclosure relate to methods of monitoring the production of LDPE polymers and copolymers in polymerization reactors in series. In some embodiments, the LDPE polymers and copolymers produced in each of the polymerization reactors may be different with respect to polymer density, molecular weight, or both, for example. In other embodiments, the LDPE polymers and copolymers produced in each of the polymerization reactors may be about equal with respect to polymer density, molecular weight, or both, for example.

To improve such production, the present techniques may employ different initiators, chain transfer agents, reactor temperatures, pressures, reactor sizes and residence times. For example, a first polymerization reactor may be operated at a lower temperature than the second polymerization reactor. Further, the reactor size and residence times may be configured such that the product stream exiting the first reactor has a total mass flow that is substantially less than the total mass flow of the product stream exiting the second reactor.

In embodiments of the present disclosure, to achieve desired polymer characteristics in the production of low-density polyethylene (LDPE) and LDPE copolymers, more than one polymerization reactor is employed, wherein each reactor may have its own set of conditions. The reactors may be autoclave or tubular reactors, and may be connected in series, such that the discharge from one reactor may be transferred to a subsequent reactor, and so forth, until a polyolefin polymer is produced discharging from the final or terminal reactor with the desired set of characteristics. The respective reactor conditions including the polymerization recipe can be set and maintained such that the polyethylene or polyethylene copolymers polymerized in each respective reactor may have a different molecular weight, different density, and so on.

Thus, in LDPE polymer and copolymer production with polymerization reactors in series, the reactors can be operated to produce LDPE polymers and copolymers having different characteristics in each reactor. For example, the ethylene and other monomers may be polymerized in the first reactor to produce a high molecular-weight LDPE or LDPE copolymer and having a low or high polymer density, and the ethylene and other monomers polymerized in the second reactor to produce a low molecular-weight LDPE or LDPE copolymer and having a low or high polymer density. On the other hand, the ethylene and other monomers may be polymerized in the first reactor to produce a low molecular-weight LDPE or LDPE copolymer and having a low or high polymer density, and the ethylene and other monomers polymerized in the second reactor to produce a high molecular-weight LDPE or LDPE copolymer and having a low or high polymer density. Further, similar molecular weight LDPE or LDPE copolymer may be produced in each reactor but with the density or other properties of the LDPE or LDPE copolymer being different in each reactor.

In embodiments of the present disclosure, a multi-reactor system is provided for producing LDPE or LDPE copolymers. In certain embodiments, the multi-reactor system includes a first autoclave reactor and a second autoclave reactor, wherein the first autoclave reactor is substantially smaller than the second autoclave reactor. For example, in some embodiments, the first and second autoclave reactors are configured such that the total LDPE or LDPE copolymer product mass flow from the first autoclave reactor is from about 10% to about 80% of the total LDPE or LDPE copolymer product mass flow from the second autoclave reactor, for example about 10%, about 15%, about 20%, about 25%, about 30%, about 35%, about 40%, about 45%, about 50%, about 55%, about 60%, about 65%, about 70%, about 75%, or about 80%, including any ranges therebetween. Advantageously, in these embodiments, because the fraction size from the first reactor is controlled and because polymerizing of the product in the second reactor occurs independently and in the presence of the product from the first reactor, the final polymer product takes its properties largely from the conditions in the second autoclave reactor.

In other embodiments, the multi-reactor system includes a first tubular reactor and a second autoclave reactor, wherein the first tubular reactor is substantially smaller than the second autoclave reactor. For example, in some embodiments, the first tubular reactor and second autoclave reactor are configured such that the total LDPE or LDPE copolymer product mass flow from the first tubular reactor is from about 10% to about 80% of the total LDPE or LDPE copolymer product mass flow from the second autoclave reactor, for example about 10%, about 15%, about 20%, about 25%, about 30%, about 35%, about 40%, about 45%, about 50%, about 55%, about 60%, about 65%, about 70%, about 75%, or about 80%, including any ranges therebetween. Advantageously, in these embodiments, the autoclave reactor may be operated successfully under both one- and two-phase conditions, while the tubular reactor is only operated under single-phase conditions. As will be readily understood by those of skill in the art, certain combinations of pressure and temperature can result in a reactor fluid consisting of 2 phases: an ethylene-rich phase and a polymer-rich phase. The polymer-rich phase tends to be more viscous than the ethylene-rich phase, making it more likely to stick to reactor walls and disturb mixing, which is particularly undesirable in a tubular reactor, where the only mixing is provided through turbulent flow. The polymer-rich phase is also less conducive to transferring heat than the ethylene-rich phase, so the polymer-rich phase may undesirably achieve higher temperatures than the surrounding bulk fluid, which may create hot spots within the reactor and initiate ethylene decomposition reactions. Further, in these embodiments, the multi-reactor system is advantageously capable of producing LDPE resins with both broad and narrow molecular weight distributions.

In some embodiments of a multi-reactor system, a first tubular reactor may be operated at pressures which are 500 to 20,000 psi higher than a second autoclave reactor. For example, a first tubular reactor and a second autoclave reactor may be operated at pressures of about 10,500 psi and about 10,000 psi; about 15,000 psi and about 10,000 psi; about 20,000 psi and about 10,000 psi; about 25,000 psi and about 10,000 psi; about 30,000 psi and about 10,000 psi; about 15,500 psi and about 15,000 psi; about 20,000 psi and about 15,000 psi; about 25,000 psi and about 15,000 psi; about 30,000 psi and about 15,000 psi; about 35,000 and about 15,000 psi; about 20,500 psi and about 20,000 psi; about 25,000 psi and about 20,000 psi; about 30,000 psi and about 20,000 psi; about 35,000 psi and about 20,000 psi; about 40,000 psi and about 20,000 psi; about 25,500 psi and about 25,000 psi; about 30,000 psi and about 25,000 psi; about 35,000 psi and about 25,000 psi; about 40,000 psi and about 25,000 psi; about 45,000 psi and about 25,000 psi; about 30,500 psi and about 30,000 psi; about 35,000 psi and about 30,000 psi; about 40,000 psi and about 30,000 psi; about 45,000 psi and about 30,000 psi; about 50,000 psi and about 30,000 psi; about 35,500 psi and about 35,000 psi; about 40,000 psi and about 35,000 psi; about 45,000 psi and about 35,000 psi; about 50,000 psi and about 35,000 psi; about 40,500 psi and about 40,000 psi; about 45,000 psi and about 40,000 psi; about 50,000 psi and about 40,000 psi; about 45,500 psi and about 45,000 psi; about 50,000 psi and about 45,000 psi; or about 50,000 psi and about 49,500 psi, respectively.

In other embodiments, the multi-reactor system includes a first autoclave reactor and a second tubular reactor, wherein the first autoclave reactor is substantially smaller than the second tubular reactor. For example, in some embodiments, the first autoclave reactor and second tubular reactor are configured such that the total LDPE or LDPE copolymer product mass flow from the first autoclave reactor is from about 10% to about 80% of the total LDPE or LDPE copolymer product mass flow from the second tubular reactor, for example about 10%, about 15%, about 20%, about 25%, about 30%, about 35%, about 40%, about 45%, about 50%, about 55%, about 60%, about 65%, about 70%, about 75%, about 80%, from about 20% to about 70%, from about 30% to about 60%, or from about 40% to about 50%. Advantageously, in these embodiments, the first autoclave reactor may be used to replace the feed preheater which is typically used in tubular reactor processes.

Various embodiments disclosed herein can significantly increase reactor conversion rates and improve the energy efficiency of LDPE or LDPE copolymer production processes compared to similar single-reactor systems. That is, the disclosed multi-reactor system and conditions provide increased conversion rates and efficiency as compared to employing the second reactor in the multi-reactor system only as a single reactor system at the same total flow rate through the reactor, regardless of what type of reactor that second reactor is. In some embodiments, the system and method described can improve the conversion rate through a multi-reactor system from about 4% to about 21% as compared to similar single-reactor systems. For example, embodiments of a multi-reactor system configured such that the total LDPE or LDPE copolymer product mass flow from the first autoclave reactor is from about 10% to about 80%, for example about 10%, about 15%, about 20%, about 25%, about 30%, about 35%, about 40%, about 45%, about 50%, about 55%, about 60%, about 65%, about 70%, about 75%, or about 80% of the total LDPE or LDPE copolymer product mass flow from the second autoclave reactor may improve the conversion rate through the multi-reactor system from about 4% to about 21% as compared to a similar autoclave reactor. Additionally, in some embodiments, cooling may be provided between the first and second reactors to increase the conversion rate in the second reactor.

Further, embodiments of the multi-reactor systems and methods allow for the production of LDPE or LDPE copolymer products over a wider range of properties than prior art single or multi-reactor systems.

Additionally, according to some embodiments, the use of a first reactor with limited production allows at least a portion of the heat of reaction in the first reactor to be carried forward to the second reactor. Because the hot output stream from the first reactor can be combined with the additional fresh ethylene-containing feed streams to the second reactor, in some embodiments the additional ethylene and feed stream(s) to the second reactor can be supplied at colder temperatures than necessary to operate the second reactor in a single reactor system. In certain embodiments, additional ethylene-containing feed streams do not need to be preheated to insure stable initiation of the polymerization reaction in the second reactor. According to another embodiment, the first reactor temperature is appropriate for initiation of polymerization in the second reactor.

According to yet another embodiment, a first autoclave reactor can be run at a low residence time and a high feed stream velocity that results in sufficient turbulence to avoid the need for mechanical mixing in the first reactor. In some embodiments, the first autoclave reactor can be operated at a temperature sufficient to initiate the reaction in a second tubular reactor or the first reaction zone of a second tubular reactor. In some embodiments, the discharge from the first autoclave reactor can be directed to the first zone of a tubular reactor, allowing reaction to initiate in the second tubular reactor without having to use another source of energy to preheat the stream to the proper initiation temperature. In some embodiments, the temperatures of the feed streams to the first autoclave reactor can be significantly lower than the temperature required to initiate reaction in the first zone of the second tubular reactor, allowing for higher overall conversion across the reactor system. In some embodiments, the reaction conditions and chain transfer agent concentration in the first autoclave reactor can be controlled independently of those in the second tubular reactor to achieve the final product properties desired.

In any of the embodiments described above, a first initiator may be added to the first reactor and a second initiator may be added to the second reactor. The first and second initiators may be added to the first and second reactors at a single feed point, or at more than one feed point. The first initiator may be the same or may be different. For example, the first and second initiators may be added via a first and second reactor feed stream and, once added, suspended in the fluid medium within the reactor. Initiator selection is often based on the initiator activity, which is expressed as the initiator half-life, as would be understood by one of skill in the art. Combinations of initiators with different half-lives may be used to obtain a desired reaction profile and desired final LDPE properties. For example, the type of initiator, concentration, and reactor temperature control the initiation rate. Initiators used to produce LDPE or LDPE copolymers in embodiments of the present disclosure may be chosen from any appropriate initiator, including organic peroxides. For example, initiators used to produce LDPE or LDPE copolymers in embodiments of the present disclosure may include dialkyl peroxides, diacyl peroxides, peroxyesters, peroxyketals, peroxydicarbonates, and the like, or combinations thereof.

Examples of dialkyl peroxides suitable for use as free radical initiators include, but are not limited to di-tertiary butyl peroxide, di-tertiary amyl peroxide, and the like, or combinations thereof.

An example of diacyl peroxides suitable for use as free radical initiators includes, but is not limited to, di-3,5,5-trimethyl hexanoyl peroxide (or di-isononanoyl peroxide).

Examples of peroxyesters suitable for use as free radical initiators include, but are not limited to tertiary-butyl peroxyacetate, tertiary-butyl peroxypivalate, tertiary-butyl peroxy-2-ethylhexanoate, tertiary-butyl peroxyneodecanoate, tertiary-butyl peroxyneoheptanoate, tertiary-butyl peroxybenzoate, tertiary-amyl peroxyacetate, tertiary-amyl peroxypivalate, tertiary-amyl peroxy-2-ethylhexanoate, tertiary-amyl peroxyneodecanoate, tertiary-amyl peroxyneoheptanoate, tertiary-amyl peroxybenzoate, and the like, or combinations thereof.

Examples of peroxyketals suitable for use as free radical initiators include, but are not limited to, 2,2-di(tertiary-butyl peroxy) butane, 2,2-di(tertiary-amyl peroxy) butane, and the like, or combinations thereof.

Examples of peroxydicarbonates suitable for use as free radical initiators include diisopropyl peroxydicarbonate, di-n-propyl peroxydicarbonate, di-secondary-butyl peroxydicarbonate, di-n-butyl peroxydicarbonate, bis(2-ethylhexyl) peroxydicarbonate, and the like, or combinations thereof.

Additionally, air is suitable for use as a free radical initiator. Air may be suitable for use as a free radical initiator in both autoclave and tubular reactors, although its use in autoclave reactors has generally been discontinued due to a perceived higher reactor decomposition rate in autoclave reactors utilizing air as an initiator.

In addition to the one or more olefin monomers and the initiator, a chain transfer agent may be transferred to the reactor. Any appropriate chain transfer agent may be used. Chain transfer agents can be chosen from one or more of alkanes, alkenes, aldehydes, ketones, thiols, halocarbons, carbon tetrachloride, or mixtures thereof. Typical chain transfer agents used in the art include propane, butane, hexane, propylene, butene, hexane, acetaldehyde, propionaldehyde, and odorless mineral spirits. In some embodiments, the same or different chain transfer agents can be added to different zones within a single reactor or to different reactors as needed to provide additional control over the molecular weight distribution of the final product. The chain transfer agents may be independently controlled in each zone or each reactor to control the rate of chain transfer in each zone or reactor independently and as needed to achieve the desired polymer properties. The use of chain transfer agents with high reactivities can be especially useful in different embodiments for providing independent control of the molecular weight of the polymers produced in each of the reactors.

FIG. 1 is a simplified schematic of a multi-reactor system according to an embodiment of the present description. A first reactor 101 has a first reactor feed stream 103 that feeds fresh monomer to the first reactor 101 at a flow rate of X pounds per hour. The fresh monomer is polymerized in the first reactor 101, and a first reactor product stream 105 exits the first reactor 101. A second reactor 107 has a second reactor feed stream 109 that feeds fresh monomer to the second reactor 107 at a flow rate of Y pounds per hour. Additionally, the first reactor product stream 105 is fed to the second reactor 107 at a flow rate of X pounds per hour. The second reactor feed stream 109 and the first reactor product stream 105 are polymerized in the second reactor 107, and a second reactor product stream 111 exits the second reactor 107. According to one embodiment, the first reactor 101 is coupled to the second reactor 107 through a pressure control valve 113 and an intercooler 115.

According to one embodiment, the total flow rate of the first reactor product stream is less than the total flow rate of the second reactor product stream. According to another embodiment, the total flow rate of the first reactor product stream is from about 10% to about 80% of the total flow rate of the second reactor product stream, for example, about 10%, about 15%, about 20%, about 25%, about 30%, about 35%, about 40%, about 45%, about 50%, about 55%, about 60%, about 65%, about 70%, about 75%, or about 80%, and any ranges therebetween. For example, the total flow rate of the first reactor product stream may be from about 20% to about 70%, from about 30% to about 60%, from about 40% to about 50%, from about 30% to about 40%, from about 20% to about 60%, or from about 30% to about 50% of the total flow rate of the second reactor product stream.

According an embodiment of a multi-reactor system wherein the total flow rate of the first reactor product stream is from about 10% to about 80% of the total flow rate of the second reactor product stream, the conversion rate is increased by at least about 4%, for example, at least about 5%, at least about 10%, at least about 15%, at least about 20%, or at least about 21%, as compared to a similar single-reactor system.

Generally, polymerization reactors may be single-zone reactors, wherein the temperature and pressure conditions are substantially equivalent throughout the reactor volume, or multiple-zone reactors, wherein the temperature and pressure conditions may differ between different individual zones within the multiple-zone reactor. For example, in a multiple-zone reactor, temperatures in individual zones may be controlled by adjusting the amount or rate of initiator fed into individual zones of the multiple-zone polymerization reactor. In single-zone or multiple-zone polymerization reactors, ethylene-containing feed streams, initiators, chain transfer agents, and any other reactants may each be added at a single feed point to each reactor, or at more than one feed point to each reactor.

In some embodiments, additional autoclave and/or tubular polymerization reactors are included either upstream of the first reactor 101 or downstream of the second reactor 107. According to an embodiment, the first reactor 101 may be an autoclave reactor and the second reactor 107 may be an autoclave reactor. According to an embodiment, the first reactor 101 may be a single-zone autoclave reactor and the second reactor 107 may be a single-zone autoclave reactor. According to an embodiment, the first reactor 101 may be a multiple-zone autoclave reactor and the second reactor 107 may be a single-zone autoclave reactor. According to an embodiment, the first reactor 101 may be a single-zone autoclave reactor and the second reactor 107 may be a multiple-zone autoclave reactor. According to an embodiment, the first reactor 101 may be a multiple-zone autoclave reactor and the second reactor 107 may be a multiple-zone autoclave reactor.

According to another embodiment, the first reactor 101 may be a tubular reactor and the second reactor 107 may be an autoclave reactor. According to another embodiment, the first reactor 101 may be a single-zone tubular reactor and the second reactor 107 may be a single-zone autoclave reactor. According to another embodiment, the first reactor 101 may be a multiple-zone tubular reactor and the second reactor 107 may be a single-zone autoclave reactor. According to another embodiment, the first reactor 101 may be a single-zone tubular reactor and the second reactor 107 may be a multiple-zone autoclave reactor. According to another embodiment, the first reactor 101 may be a multiple-zone tubular reactor and the second reactor 107 may be a multiple-zone autoclave reactor.

According to yet another embodiment, the first reactor 101 may be an autoclave reactor and the second reactor 107 may be a tubular reactor. According to yet another embodiment, the first reactor 101 may be a single-zone autoclave reactor and the second reactor 107 may be a single-zone tubular reactor. According to yet another embodiment, the first reactor 101 may be a multiple-zone autoclave reactor and the second reactor 107 may be a single-zone tubular reactor. According to yet another embodiment, the first reactor 101 may be a single-zone autoclave reactor and the second reactor 107 may be a multiple-zone tubular reactor. According to yet another embodiment, the first reactor 101 may be a multiple-zone autoclave reactor and the second reactor 107 may be a multiple-zone tubular reactor.

In some embodiments, the multiple-zone polymerization reactor(s) may have physical barriers between individual zones which limit backmixing between individual zones. In other embodiments, the multiple-zone polymerization reactor(s) may have multiple zones created by using stirring currents which establish nearly independent circulating patterns which can be controlled somewhat independently.

In some embodiments, the polymerization reactor(s) have multiple sites through which ethylene monomer, comonomers, initiators, and chain transfer agents may be introduced. In some embodiments, at least one initiator is inserted into each multiple-zone polymerization reactor at each individual reactor zone. Further, in some embodiments, the temperature of each reaction zone may be controlled by adjusting the amount of initiator inserted into each reactor zone.

Figure 2:
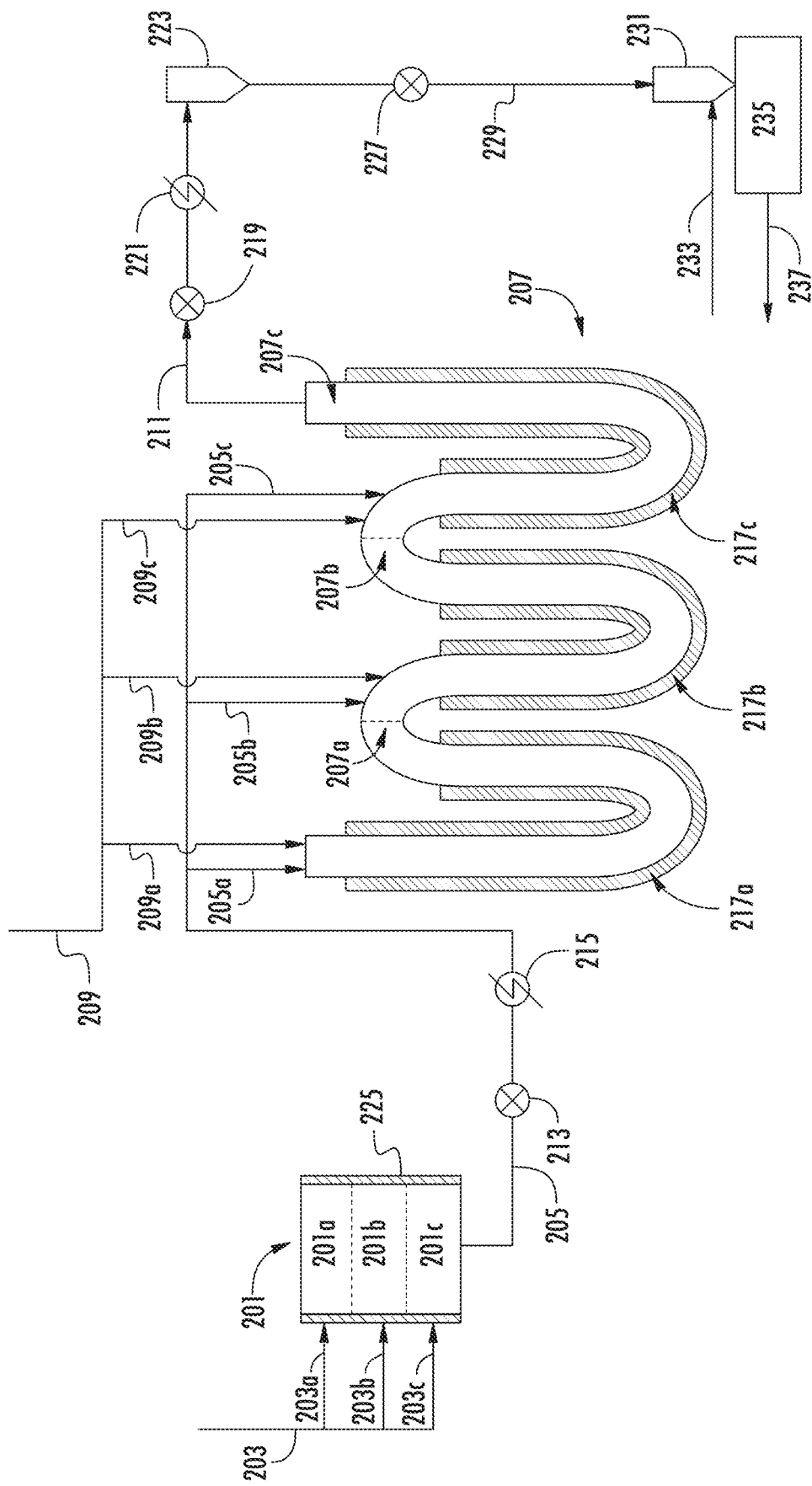
FIG. 2 is a simplified schematic of the multi-reactor system of FIG. 1, comprising a first multiple-zone autoclave reactor and a second multiple-zone tubular reactor, according to a disclosed embodiment.

FIG. 2 is a simplified schematic of a multi-reactor system according to an embodiment of the present description. A first multiple-zone autoclave reactor 201 has three reactor zones 201a, 201b, and 201c, and a first reactor feed stream 203 that feeds fresh monomer feed streams 203a, 203b, and 203c to each reactor zone 201a, 201b, and 201c of the first reactor 201 at a total combined flow rate of X pounds per hour. In some embodiments, the first multiple-zone autoclave reactor 201 has a cooling system 225. The fresh monomer is polymerized in the first multiple-zone autoclave reactor 201, and a first reactor product stream 205 exits the first reactor 201. The first multiple-zone autoclave reactor 201 is coupled to the second multiple-zone tubular reactor 207 through a pressure control valve 213 and an intercooler 215. The second multiple-zone tubular reactor 207 has three reactor zones 207a, 207b, and 207c and has a second reactor feed stream 209 that feeds fresh monomer feed streams 209a, 209b, and 209c to each of the reactor zones 207a, 207b, and 207c of the second reactor 207 at a total combined flow rate of Y pounds per hour. Additionally, the first reactor product stream 205 is fed to each of the reactor zones 207a, 207b, and 207c of the second reactor 207 at a total combined flow rate of X pounds per hour. The second multiple-zone reactor 207 may further include cooling jackets 217a, 217b, and 217c, which remove the heat of reaction created by the polymerization reaction. The second reactor feed streams 209a, 209b, and 209c, and the first reactor product stream 205 are polymerized in the second reactor 207, and a second reactor product stream 211 exits the second reactor 207. In some embodiments, the reactor product stream 211 is coupled to a high pressure separator 223 through a second pressure control valve 219 and a product cooler 221. In some embodiments, the high pressure separator 223 is coupled to a hopper 231 through a third pressure control valve 227. In some embodiments, the separated stream 229 is then fed into a hopper 231, where other optional additives are added to the hopper in an additive stream 233. Finally, in some embodiments, the hopper is coupled to an extruder 235, which extrudes the LDPE or LDPE co-polymer in a final product stream 237.

Figure 3:
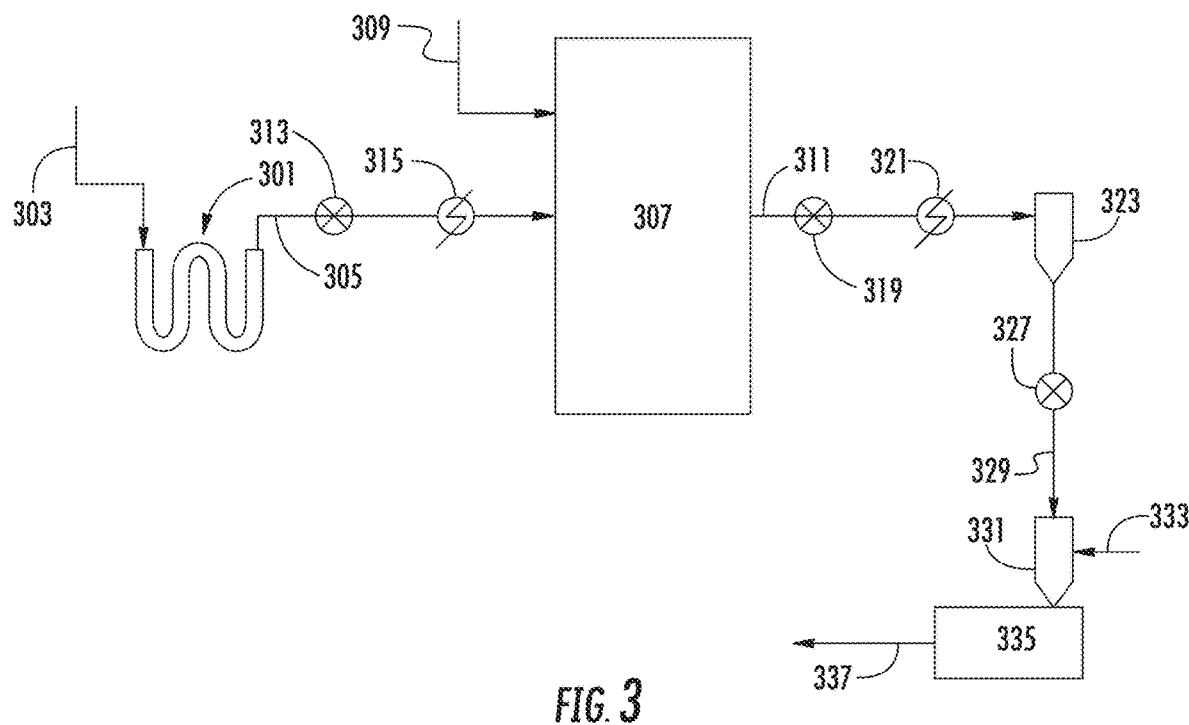
FIG. 3 is a simplified schematic of the multi-reactor system of FIG. 1, comprising a first tubular reactor and a second autoclave reactor, according to a disclosed embodiment.

FIG. 3 is a simplified schematic of a multi-reactor system according to an embodiment of the present description. A first tubular reactor 301 has a first reactor feed stream 303 that feeds fresh monomer to the first tubular reactor 301 at a flow rate of X pounds per hour. The fresh monomer is polymerized in the first tubular reactor 301, and a first reactor product stream 305 exits the first tubular reactor 301. A second autoclave reactor 307 has a second reactor feed stream 309 that feeds fresh monomer to the second autoclave reactor 307 at a flow rate of Y pounds per hour. Additionally, the first reactor product stream 305 is fed to the second autoclave reactor 307 at a flow rate of X pounds per hour. The second reactor feed stream 309 and the first reactor product stream 305 are polymerized in the second autoclave reactor 307, and a second reactor product stream 311 exits the second autoclave reactor 307. According to one embodiment, the first tubular reactor 301 is coupled to the second autoclave reactor 307 through a pressure control valve 313 and an intercooler 315. In some embodiments, the reactor product stream 311 is coupled to a high pressure separator 323 through a second pressure control valve 319 and a product cooler 321. In some embodiments, the high pressure separator 323 is coupled to a hopper 331 through a third pressure control valve 327. In some embodiments, the PCH separated stream 329 is then fed into a hopper 331, where other optional additives are added to the hopper in an additive stream 333. Finally, in some embodiments, the hopper is coupled to an extruder 335, which extrudes the LDPE or LDPE co-polymer in a final product stream 337.

The first tubular reactor 301 and the second autoclave reactor 307 may each individually be single-zone reactors, wherein the temperature and pressure conditions are substantially equivalent throughout the reactor volume, or multiple-zone reactors, wherein the temperature and pressure conditions may differ between different individual zones within the multiple-zone reactor.

In some embodiments, additional autoclave and/or tubular polymerization reactors are included either upstream of the first tubular reactor 301 or downstream of the second autoclave reactor 307.

In some embodiments wherein either or both of the first tubular reactor 301 and the second autoclave reactor 307 is a multiple-zone reactor, the first tubular reactor 301 and/or the second autoclave reactor 307 may have physical barriers between individual zones which limit backmixing between individual zones. In other embodiments, wherein either or both of the first tubular reactor 301 and the second autoclave reactor 307 is a multiple-zone reactor, the first tubular reactor 301 and/or the second autoclave reactor 307 may have multiple zones created by using stirring currents which establish nearly independent circulating patterns which can be controlled somewhat independently.

In some embodiments, the first tubular reactor 301 and the second autoclave reactor 307 may each individually have multiple sites through which ethylene monomer, comonomers, initiators, and chain transfer agents may be introduced. In some embodiments, at least one initiator is inserted into each multiple-zone polymerization reactor at each individual reactor zone. Further, in some embodiments, the temperature of each reaction zone may be controlled by adjusting the amount of initiator inserted into each reactor zone.

Figure 4:
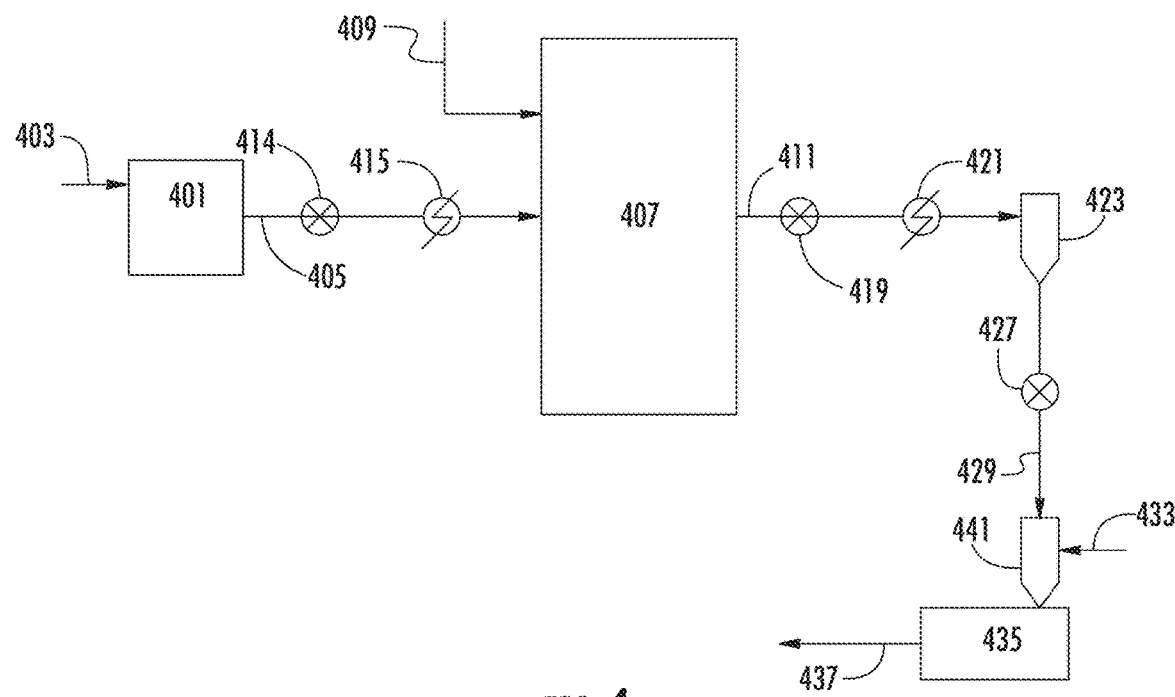
FIG. 4 is a simplified schematic of the multi-reactor system of FIG. 1, comprising a first autoclave reactor and a second autoclave reactor, according to an embodiment of this disclosure.

FIG. 4 is a simplified schematic of a multi-reactor system according to an embodiment of the present description. A first autoclave reactor 401 has a first reactor feed stream 403 that feeds fresh monomer to the first autoclave reactor 401 at a flow rate of X pounds per hour. The fresh monomer is polymerized in the first autoclave reactor 401, and a first reactor product stream 405 exits the first autoclave reactor 401. A second autoclave reactor 407 has a second reactor feed stream 409 that feeds fresh monomer to the second autoclave reactor 407 at a flow rate of Y pounds per hour. Additionally, the first reactor product stream 405 is fed to the second autoclave reactor 407 at a flow rate of X pounds per hour. The second reactor feed stream 409 and the first reactor product stream 405 are polymerized in the second autoclave reactor 407, and a second reactor product stream 411 exits the second autoclave reactor 407. According to one embodiment, the first autoclave reactor 401 is coupled to the second autoclave reactor 407 through a pressure control valve 414 and an intercooler 415. In some embodiments, the reactor product stream 411 is coupled to a high pressure separator 423 through a second pressure control valve 419 and a product cooler 421. In some embodiments, the high pressure separator 423 is coupled to a hopper 441 through a third pressure control valve 427. In some embodiments, the PCH separated stream 429 is then fed into a hopper 441, where other optional additives are added to the hopper in an additive stream 433. Finally, in some embodiments, the hopper is coupled to an extruder 435, which extrudes the LDPE or LDPE co-polymer in a final product stream 437.

The first autoclave reactor 401 and the second autoclave reactor 407 may each individually be single-zone reactors, wherein the temperature and pressure conditions are substantially equivalent throughout the reactor volume, or multiple-zone reactors, wherein the temperature and pressure conditions may differ between different individual zones within the multiple-zone reactor.

In some embodiments, additional autoclave and/or tubular polymerization reactors are included either upstream of the first autoclave reactor 401 or downstream of the second autoclave reactor 407.

In some embodiments wherein either or both of the first autoclave reactor 401 and the second autoclave reactor 407 is a multiple-zone reactor, the first autoclave reactor 401 and/or the second autoclave reactor 407 have physical barriers between individual zones which limit backmixing between individual zones. In other embodiments, wherein either or both of the first autoclave reactor 401 and the second autoclave reactor 407 is a multiple-zone reactor, the first autoclave reactor 401 and/or the second autoclave reactor 407 may have multiple zones created by using stirring currents which establish nearly independent circulating patterns which can be controlled somewhat independently.

In some embodiments, the first autoclave reactor 401 and the second autoclave reactor 407 may each individually have multiple sites through which ethylene monomer, comonomers, initiators, and chain transfer agents may be introduced. In some embodiments, at least one initiator is inserted into each multiple-zone polymerization reactor at each individual reactor zone. Further, in some embodiments, the temperature of each reaction zone may be controlled by adjusting the amount of initiator inserted into each reactor zone.

In some embodiments, the first autoclave reactor has a reactor pressure of from about 10,000 psi to about 50,000 psi, for example about 10,000 psi, about 15,000 psi, about 20,000 psi, about 25,000 psi, about 30,000 psi, about 35,000 psi, about 40,000 psi, about 45,000 psi, about 50,000 psi, from about 10,000 to about 40,000 psi, from about 20,000 psi to about 40,000 psi, from about 30,000 psi to about 50,000 psi, or from about 17,000 to about 35,000 psi. In some embodiments, the second autoclave reactor has a reactor pressure of from about 10,000 psi to about 50,000 psi, for example about 10,000 psi, about 15,000 psi, about 20,000 psi, about 25,000 psi, about 30,000 psi, about 35,000 psi, about 40,000 psi, about 45,000 psi, about 50,000 psi, from about 10,000 to about 40,000 psi, from about 20,000 psi to about 40,000 psi, from about 30,000 psi to about 50,000 psi, or from about 17,000 to about 35,000 psi. In some embodiments, the first autoclave reactor and the second autoclave reactor each have a reactor pressure of from about 10,000 psi to about 50,000 psi, for example about 10,000 psi, about 15,000 psi, about 20,000 psi, about 25,000 psi, about 30,000 psi, about 35,000 psi, about 40,000 psi, about 45,000 psi, about 50,000 psi, from about 10,000 to about 40,000 psi, from about 20,000 psi to about 40,000 psi, from about 30,000 psi to about 50,000 psi, or from about 17,000 to about 35,000 psi.

In some embodiments, the first autoclave reactor has a reactor temperature of from about 150° C. to about 310° C., for example about 150° C., about 155° C., about 160° C., about 170° C., about 180° C., about 190° C., about 200° C., about 210° C., about 220° C., about 230° C., about 240° C., about 250° C., about 260° C., about 270° C., about 280° C., about 290° C., about 300° C., or about 310° C., and ranges between these values. In some embodiments, the second autoclave reactor has a reactor temperature of from about 150° C. to about 310° C., for example about 150° C., about 155° C., about 160° C., about 170° C., about 180° C., about 190° C., about 200° C., about 210° C., about 220° C., about 230° C., about 240° C., about 250° C., about 260° C., about 270° C., about 280° C., about 290° C., about 300° C., or about 310° C. In some embodiments, the first autoclave reactor and the second autoclave reactor each have a reactor temperature of from about 150° C. to about 310° C., for example about 150° C., about 155° C., about 160° C., about 170° C., about 180° C., about 190° C., about 200° C., about 210° C., about 220° C., about 230° C., about 240° C., about 250° C., about 260° C., about 270° C., about 280° C., about 290° C., about 300° C., or about 310° C.

In some embodiments, residence time in the first autoclave reactor will be between about 20 and about 120 seconds, for example from about 20 to about 60 seconds. In some embodiments, residence time in the second autoclave reactor will be between about 20 and about 120 seconds, for example from about 20 to about 60 seconds. In some embodiments, residence time in the first autoclave reactor and the second autoclave reactor will each be between about 20 and about 120 seconds, for example from about 20 to about 60 seconds.

In some embodiments, a first tubular reactor may be from about 700 to about 1500 meters in tube length. In some embodiments, a first tubular reactor may be a multiple-zone tubular reactor, wherein each zone measures from about 300 to about 500 meters in length. Additionally, in some embodiments, each zone may include a short reaction section measuring from about 100 to about 200 meters in length, followed by a cooling section measuring from about 200 to about 300 meters in length. In some embodiments, a second tubular reactor may be from about 700 to about 1500 meters in tube length. In some embodiments, a second tubular reactor may be a multiple-zone tubular reactor, wherein each zone measures from about 300 to about 500 meters in length. Additionally, in some embodiments, each zone may include a short reaction section measuring from about 100 to about 200 meters in length, followed by a cooling section measuring from about 200 to about 300 meters in length.

In some embodiments, a first tubular reactor may have a reactor pressure of from about 24,000 to about 50,000 psi, for example 24,000 psi, 30,000 psi, 35,000 psi, 40,000 psi, 45,000 psi, 50,000 psi, from about 24,000 to about 40,000 psi, for example, from about 35,000 to about 40,000 psi. In some embodiments, a second tubular reactor may have a reactor pressure of from about 24,000 to about 50,000 psi, for example 24,000 psi, 30,000 psi, 35,000 psi, 40,000 psi, 45,000 psi, 50,000 psi, from about 24,000 to about 40,000 psi, for example, from about 35,000 to about 40,000 psi.

In some embodiments, a first tubular reactor has a peak reactor temperature (e.g., the maximum temperature in any individual reaction zone) of from about 250° C. to about 350° C., for example from about 275° C. to about 305° C. In some embodiments, a second tubular reactor has a peak reactor temperature (e.g., the maximum temperature in any individual reaction zone) of from about 250° C. to about 350° C., for example from about 275° C. to about 305° C.

In some embodiments, a first tubular reactor has a residence time of from about 30 seconds to about 120 seconds. In some embodiments, a second tubular reactor has a residence time of from about 30 seconds to about 120 seconds. In some embodiments, a first tubular reactor has an average fluid velocity of more than 5 meters per second, for example from about 10 meters per second to about 20 meters per second. In some embodiments, a second tubular reactor has an average fluid velocity of more than 5 meters per second, for example from about 10 meters per second to about 20 meters per second.

In some embodiments, a process for monitoring the polymerization of ethylene or ethylene and comonomers in the presence of a free-radical polymerization initiator at pressures from about 10,000 psi to about 40,000 psi and at temperatures from about 320° F. to about 600° F. in a multi-reactor system is provided. For example, in some embodiments, a process is provided for monitoring the polymerization of ethylene or ethylene and comonomers in a multi-reactor system in the presence of a free-radical polymerization initiator at pressures from about 10,000 psi to about 40,000 psi, for example about 10,000 psi, about 15,000 psi, about 20,000 psi, about 25,000 psi, about 30,000 psi, about 35,000 psi, or about 40,000 psi, and at temperatures from about 320° F. to about 600° F., for example about 320° F., about 350° F., about 400° F., about 450° F., about 500° F., about 550° F., about 600° F., from about 350° F. to about 400° F., from about 400° F. to about 450° F., from about 450° F. to about 500° F., from about 500° F. to about 550° F., or from about 550° F. to about 600° F. This process for monitoring can be used both for the homopolymerization of ethylene and for the copolymerization of ethylene with one or more other monomers. Further, this process for monitoring can be used in conjunction with any of the multi-reactor systems and methods described above. According to some embodiments, the polymerization in a multi-reactor system is monitored by a process which outputs an alarm signal if the risk of a thermal runaway exceeds a certain level. This process comprises a step of measuring the temperature profile and the pressure of the reaction medium and the flow and temperature profile of the cooling medium along the reactor. This step of measuring is carried out with sufficient accuracy as generally provided by using standard equipment which would be known to one of skill in the art.

Further, a sufficient number of temperature measuring devices are placed along each reactor in order to determine the temperature profile to a sufficiently precise degree. Preferably, each tubular reactor is equipped with a temperature measuring device for measuring the temperature of the reaction medium at least every 50 meters, for example at least every 40 meters, 30 meters, or 20 meters along the length of the reactor. Preferably, each autoclave reactor is equipped with at least one temperature measuring device for measuring the temperature of the reaction medium for each individual reaction zone, or is equipped with at least three temperature-measuring devices for measuring the temperature of the reaction medium. The temperatures of the reaction medium in each reactor may be measured by any suitable means, such as thermocouples as described in WO 97/25601. Preferably, the means for measuring the temperature of the reaction mediums have a relative accuracy of the temperature measurements of not more than 3% of the measuring range, for example not more than 2%, or 1.5% of the measuring range.

Preferably, the devices for measuring the temperature of the cooling medium are located at the same positions relative to the length of the reactors as the devices for measuring the temperature of the reaction medium. Preferably, each tubular reactor is equipped with a temperature measuring device for measuring the temperature of the cooling medium at least every 50 meters, for example at least every 40 meters, 30 meters, or 20 meters along the length of the reactor. The temperatures of the cooling medium along each reactor may be measured by any suitable means, such as Resistance Temperature Detectors (RTD) or Thermocouples (typically Type K or Type J). Preferably, the means for measuring the temperature of the cooling mediums have a relative accuracy of the temperature measurements of not more than 3% of the measuring range, for example not more than 2%, or 1.5% of the measuring range.

The flow of the cooling medium along the cooling jackets of each reactor may be determined by any appropriate equipment as would be understood by one of skill in the art. In some embodiments, the flow of the cooling medium along the cooling jacket is preferably determined by flow meters. Such flow meters preferably have a relative failure of not more than 15% of the measuring range, for example not more than 10%, or not more than 5% of the measuring range. The pressure inside each reactor is preferably determined by pressure sensors. Pressure sensors are preferably positioned at various locations along each reactor. For example, in some embodiments, each reactor is independently equipped with at least three pressure sensors. In some embodiments, each reactor is equipped with a pressure sensor at each feed stream, along the reactor body, and at each reactor product stream. In some embodiments, the feed rates of initiators to each reactor are measured using suitable instruments, such as Coriolis meters or integral orifice meters. In some embodiments, positive displacement pumps are used to provide a motive force to feed the initiators to each reactor, and the feed rates of initiators to each reactor are calculated based on the displacement rate of the positive displacement pumps. In some embodiments, the feed rates of ethylene to each reactor may be estimated by compressor simulations, given the mechanical attributes of the feed compressor, such as displacement volume rates at each stage, and densities of the fluid comprising the suction and discharge streams to each stage. In these embodiments, the fluid densities may be estimated using thermodynamic equations of state that describe the fluid at measured temperatures and pressures.

Taking the measured process data as parameters, concentrations of free-radical polymerization initiator, chain-transfer agent, ethylene, and, if present, comonomers are calculated along each reactor based on a model for the polymerization process. In some embodiments, the model is a first principle model which uses implicit differential equations and iterative calculation procedures for describing the conditions inside each reactor and the interaction of different parts of the LDPE plant. Preferably, such a model combines a classic reaction model, which describes the whole polymerization reaction including decomposition of initiator, chain propagation, chain termination, backbiting and chain transfer and the occurrence of heat and mass transfer phenomena, with a model describing the thermal self-decomposition of monomer. Especially preferred models for the polymerization process consist of kinetic and thermodynamic balances and take into account mass transport phenomena.

Generally, the calculation of the concentrations of free-radical polymerization initiator, chain-transfer agent, ethylene, and, if present, comonomers along each reactor are sufficiently fast to be solved online during plant operation, that is, within a limited cycle time. In some embodiments, the concentrations of free-radical polymerization initiator, chain-transfer agent, ethylene, and, if present, comonomers along each reactor are calculated at least every minute, for example every 30 seconds, 15 seconds, 5 seconds, 1 second, or 0.5 seconds.

There are so many calculations carried out at a position along each reactor that, for a volume unit flowing through each reactor, typically there is made at least one calculation every 1 second, for example every 0.5 seconds, or every 0.1 seconds. In other words, the distance of the positions along a polymerization reactor where the calculation is carried out are so that, for a given flow rate, the time for an average volume unit flowing through the reactor is typically less than 1 second until the next position is reached where a further calculation is carried out. For example, where the flow rate of a reaction medium through a polymerization reactor is 10 meters per second, the distance between two positions where a calculation is carried out is less than 10 meters, for example less than 5 meters or less than 1 meter.

Based on calculated concentrations of free-radical polymerization initiator, chain-transfer agent, ethylene and, if present, comonomers, on measured process parameters, and on known reaction kinetics, known induced turbulence from mechanical stirring or fluid flow, and average heat and mass transport properties of the reaction fluid, the cooling power, the rate of heat generation, the radial and axial temperature profiles of the reaction fluids, and the concentration of radicals is calculated along each reactor. The cooling power is preferably calculated via the heat balance on the cooling medium. The generation of heat is preferably calculated by using the measured reactor temperatures taking into account the cooling power. The amount of generated heat in combination with the known heat and mass transport properties of the reaction fluid and the calculated turbulence imparted to the fluid are used to estimate the radial and axial temperature profiles along each reactor. In some embodiments, the model or models for the polymerization process for each reactor has been refined by adjusting it to factual conditions measured in the LDPE plant.

At the positions along each reactor having the highest temperatures, the potential of a thermal runaway of the reaction mixture is then calculated based on the data obtained in the previous calculation steps. In some embodiments, the conditions at these positions along each reactor are further compared with previously-recorded conditions at such positions along each reactor shortly before and during a thermal runaway of the reaction mixture.

If the calculated value for the potential of thermal runaway exceeds a predefined value in either or both reactors, an alarm signal is output, or an interlock is activated. In some embodiments, the interlock will shut down the polymerization reaction in a controlled fashion by stopping the flow of initiator to the reactor. In some embodiments, the interlock may simultaneously depressure the reactor in a controlled fashion to aid in halting the reactions. In some embodiments, the alarm is brought to the attention of shift personnel in the LDPE plant who are operating the polymerization reactor.

In some embodiments, two kinds of alarm signals are output for each reactor: a first-level alarm signal, which indicates that the reaction system in either or both reactors is close to the limit of decomposition at one or more points in either or both of the polymerization reactors, and a second level alarm signal, which indicates that the reaction system in either or both of the polymerization reactors is at one or more points in the polymerization reactor within decomposition limit and a small variation of any process parameter can result immediately in a thermal runaway.

By using the multi-reactor system and methods described above with this monitoring process, it is possible to drastically reduce the factual number of thermal runaways in the polymerization of ethylene or ethylene and comonomers.

Figure 5:
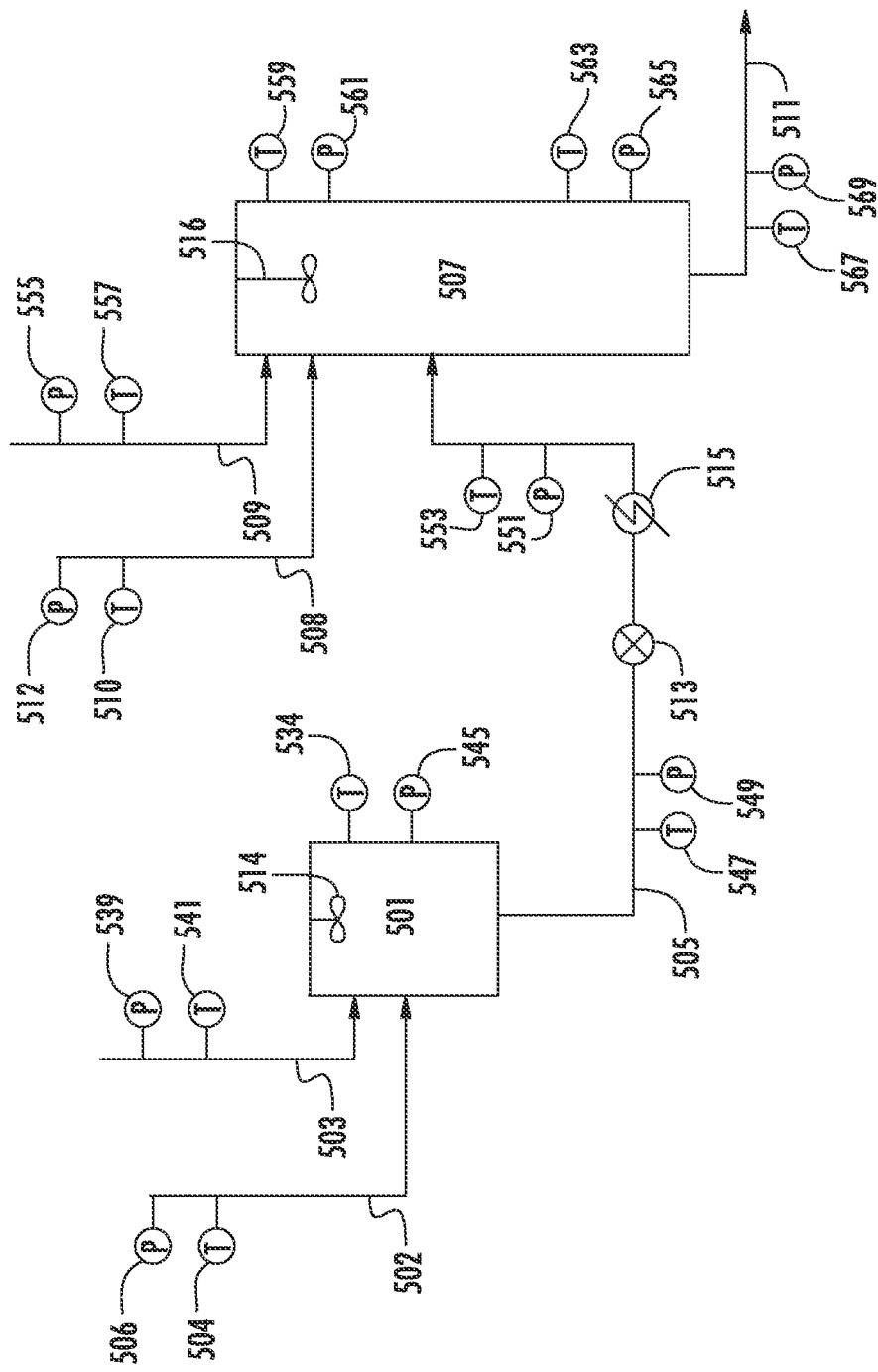
FIG. 5 is a simplified schematic of a process for monitoring the polymerization of ethylene or ethylene and comonomers in the multi-reactor system of FIG. 1.

FIG. 5 is a simplified schematic of a multi-reactor system suitable for use in the method of monitoring described above, according to an embodiment of the present description. A first reactor 501 has a first reactor is equipped with at least one temperature sensor 534 and at least one pressure sensor 545, and a feed stream 503 that feeds fresh monomer to the first reactor 501 at a flow rate of X pounds per hour. The flow rate of feed stream 503 may be estimated using compressor simulations known to those of skill in the art. The feed stream 503 is equipped with at least one temperature sensor 541 and at least one pressure sensor 539. Initiator is also fed to the first reactor 501 through initiator feed stream 502, and may be measured using meters known to those of skill in the art, or may be estimated using positive displacement pump simulations known to those of skill in the art. For example, the flow rate of initiator feed stream 502 may be estimated using compressor simulations known to those of skill in the art. In some embodiments, the initiator feed stream 502 is equipped with at least one temperature sensor 504 and at least one pressure sensor 506. Fresh monomer is polymerized in the first reactor 501, and a first reactor product stream 505 exits the first reactor 501. In some embodiments, the first reactor 501 is equipped with at least one stirrer 514. Stirrer 514 has a stirrer power A and rotates at a speed of B revolutions per minute. A second reactor 507 has a second reactor feed stream 509 that feeds fresh monomer to the second reactor 507 at a flow rate of Y pounds per hour. In some embodiments, the first reactor product stream 505 is equipped with at least one temperature sensor 547 and at least one pressure sensor 549 upstream from a pressure control valve 513 and an intercooler 515, and is equipped with at least one temperature sensor 553 and at least one pressure sensor 551 downstream from a pressure control valve 513 and an intercooler 515. Additionally, the first reactor product stream 505 is fed to the second reactor 507 at a flow rate of X pounds per hour. Initiator is also fed to the second reactor 507 through initiator feed stream 508, and may be measured using meters known to those of skill in the art, or may be estimated using positive displacement pump simulations known to those of skill in the art. For example, the flow rate of initiator feed stream 508 may be estimated using compressor simulations known to those of skill in the art. In some embodiments, the initiator feed stream 508 is equipped with at least one temperature sensor 510 and at least one pressure sensor 512. In some embodiments, the second reactor 507 is equipped with at least two temperature sensors 559, 563 and at least two pressure sensors 561, 565. The second reactor feed stream 509 is equipped with at least one temperature sensor 557 and at least one pressure sensor 555. The second reactor feed stream 509 and the first reactor product stream 505 are polymerized in the second reactor 507, and a second reactor product stream 511 exits the second reactor 507. In some embodiments, the first reactor 501 is equipped with at least one stirrer 516. Stirrer 516 has a stirrer power C and rotates at a speed of D revolutions per minute. In some embodiments, the second reactor product stream 511 is equipped with at least one temperature sensor 567 and at least one pressure sensor 569.

ADDITIONAL DISCLOSURE

Methods and systems for producing LDPE polymers and copolymers in multi-reactor systems have been described, as well as methods of monitoring the same. The following clauses are offered as further description:

Embodiment 1

A method for the production of a low-density polyethylene polymer in a multi-reactor system comprising: adding a first ethylene-containing feed stream to a first polymerization reactor; polymerizing the first ethylene-containing feed stream in the first polymerization reactor in the presence of a first initiator to create a first reactor product stream; transferring the first reactor product stream from the first polymerization reactor to a second polymerization reactor; adding a second ethylene-containing feed stream to the second polymerization reactor; polymerizing the first reactor product stream and the second ethylene-containing feed stream in the presence of a second initiator to produce a second reactor product stream comprising a low-density polyethylene polymer; wherein the first reactor product stream has a total mass flow that is about 10% to about 80% of the total mass flow of the second reactor product stream.

Embodiment 2

The method of embodiment 1, wherein at least a portion of the second ethylene-containing feed stream is added to the first reactor product stream before it is added to the second polymerization reactor.

Embodiment 3

The method of any of the previous embodiments, wherein the overall conversion rate to the low-density polyethylene polymer is improved by at least about 4%-21% when compared to the overall conversion rate of a similar tubular reactor, wherein the similar tubular reactor has a total mass flow that is at least 90% of the total mass flow of the second reactor product stream.

Embodiment 4

The method of any of the previous embodiments, wherein the first reactor product stream is transferred from the first autoclave reactor to a second tubular reactor at a temperature sufficient to cause initiation of the polymerization reactor in the second tubular reactor.

Embodiment 5

The method of any of the previous embodiments, wherein the first reactor product stream is transferred from the first autoclave reactor to a second tubular reactor at a temperature of about 250° F. to 390° F.

Embodiment 6

The method of any of the previous embodiments, wherein the overall conversion rate to the low-density polyethylene polymer is improved by at least about 4%-21% when compared to the overall conversion rate of a similar tubular reactor, wherein the similar tubular reactor has a total mass flow that is at least 90% of the total mass flow of the second reactor product stream.

Embodiment 7

The method of embodiment 1, wherein the first polymerization reactor comprises an autoclave reactor and the second polymerization reactor comprises an autoclave reactor. 8.

Embodiment 8

The method of any of the previous embodiments, wherein the first ethylene-containing feed stream is introduced at sufficient velocity to produce turbulent flow within the first polymerization reactor, and wherein polymerizing the first ethylene-containing feed stream in the first autoclave reactor is accomplished without mechanical stirring.

Embodiment 9

The method of embodiment 1, wherein the first polymerization reactor comprises a tubular reactor and the second polymerization reactor comprises an autoclave reactor.

Embodiment 10

The method of any of the previous embodiments, wherein the first initiator and the second initiator are the same.

Embodiment 11

The method of any of the previous embodiments, wherein the first initiator and the second initiator are different.

Embodiment 12

The method of any of the previous embodiments, wherein the step of polymerizing the first ethylene-containing feed stream in the first polymerization reactor further comprises polymerizing the first ethylene-containing feed stream in the first polymerization reactor in the presence of a chain transfer agent.

Embodiment 13

The method of embodiment 12, wherein the chain transfer agent is introduced to the first polymerization reactor at more than one location.

Embodiment 14

The method of any of the previous embodiments, wherein the step of polymerizing the first reactor product stream and the second ethylene-containing feed stream further comprises polymerizing the first reactor product stream and the second ethylene-containing feed stream in the presence of a chain transfer agent.

Embodiment 15

The method of embodiment 14, wherein the chain transfer agent is introduced to the second autoclave reactor at more than one location.

Embodiment 16

The method of any of the previous embodiments, wherein the step of polymerizing the first ethylene-containing feed stream in the first polymerization reactor further comprises polymerizing the first ethylene-containing feed stream in the first polymerization reactor in the presence of a first chain transfer agent; and the step of polymerizing the first reactor product stream and the second ethylene-containing feed stream further comprises polymerizing the first reactor product stream and the second ethylene-containing feed stream in the presence of a second chain transfer agent.

Embodiment 17

The method of embodiment 16, wherein the first chain transfer agent and the second chain transfer agent are different.

Embodiment 18

The method of embodiment 16, wherein the first chain transfer agent and the second chain transfer agent are the same.

Embodiment 19

The method of any of the previous embodiments, wherein the first initiator is introduced to the first polymerization reactor at more than one location.

Embodiment 20

The method of any of the previous embodiments, wherein the second initiator is introduced to the second polymerization reactor at more than one location.

Embodiment 21

The method of any of the previous embodiments, wherein the pressure within each of the first polymerization reactor and the second polymerization reactor is independently between about 10,000 psi and about 50,000 psi.

Embodiment 22

The method of any of the previous embodiments, wherein the mass flow of the first reactor product stream is between about 30% and about 50% of the total mass flow of the second reactor product stream.

Embodiment 23

The method of any of the previous embodiments, wherein the temperature within each of the first polymerization reactor and the second polymerization reactor is independently between about 320° F. and about 600° F.

Embodiment 24

The method of any of the previous embodiments, wherein the residence time within each of the first polymerization reactor and the second polymerization reactor is independently from about 20 to about 120 seconds.

Embodiment 25

The method of any of the previous embodiments, further comprising the step of cooling the first reactor product stream before or during transfer from the first polymerization reactor to the second polymerization reactor.

Embodiment 26

The method of embodiment 1, wherein the second polymerization reactor comprises an autoclave reactor and the overall conversion rate to the low-density polyethylene polymer is improved by at least about 4%-40% when compared to the overall conversion rate of a similar autoclave reactor, wherein the similar autoclave reactor has a total mass flow that is at least 90% of the total mass flow of the second reactor product stream.

Embodiment 27

A multi-reactor system for the production of low-density polyethylene polymers comprising: a first polymerization reactor configured to receive a first ethylene-containing feed stream and further configured to polymerize said ethylene-containing feed stream in the presence of a first initiator to create a first reactor product stream; a second polymerization reactor configured to receive the first reactor product stream and a second ethylene-containing feed stream and further configured to polymerize said first reactor product stream and second ethylene-containing feed stream in the presence of a second initiator to create a second reactor product stream comprising low-density polyethylene polymers; wherein the first polymerization reactor and the second polymerization reactor are configured such that the first reactor product stream has a total mass flow of from about 10% to about 80% of the total mass flow of the second reactor product stream.

Embodiment 28

The multi-reactor system of embodiment 27, wherein the first polymerization reactor comprises an autoclave reactor and the second polymerization reactor comprises an autoclave reactor.

Embodiment 29

The multi-reactor system of embodiment 28, wherein the first autoclave reactor does not contain any mechanical stirring units.

Embodiment 30

The multi-reactor system of embodiment 28, wherein the second autoclave reactor does not contain any mechanical stirring units.

Embodiment 31

The multi-reactor system of embodiment 27, wherein the first polymerization reactor comprises a tubular reactor and the second polymerization reactor comprises an autoclave reactor.

Embodiment 32

The multi-reactor system of embodiment 31, wherein the second autoclave reactor does not contain any mechanical stirring units.

Embodiment 33

The multi-reactor system of embodiment 27, wherein the first polymerization reactor comprises an autoclave reactor and the second polymerization reactor comprises a tubular reactor.

Embodiment 34

The multi-reactor system of embodiment 33, wherein the first autoclave reactor does not contain any mechanical stirring units.

Embodiment 35

The multi-reactor system of any of the previous embodiments, wherein the inner volume of the first polymerization reactor is between about 30% and about 50% of the inner volume of the second polymerization reactor.

Embodiment 36

The multi-reactor system of any of the previous embodiments, further comprising a cooling unit disposed between the first polymerization reactor and the second polymerization reactor, configured to cool the first reactor product stream.

Embodiment 37

A process for monitoring the polymerization of ethylene or ethylene and comonomers in the presence of a free-radical polymerization initiator at pressures from about 10,000 psi to about 50,000 psi and at temperatures from about 320° F. to about 600° F. in a multi-reactor system, comprising the steps of: a) providing a multi-reactor system comprising a first polymerization reactor and a second polymerization reactor, wherein the inner volume of the first polymerization reactor is between about 30% and about 50% of the inner volume of the second polymerization reactor; b) measuring as process parameters the temperature profiles and the pressures of the reaction mediums and the flow and temperature profiles of the cooling mediums along each of the first and second polymerization reactors, c) monitoring the feeds of ethylene, comonomer, free-radical polymerization initiator, and chain-transfer agent to each of the first and second polymerization reactors, d) calculating, based on process parameters and on a model for the polymerization process, concentrations for free-radical polymerization initiator, chain transfer agent, ethylene and comonomers at a sufficient number of positions along each the first polymerization reactor and the second polymerization reactor such that at least one calculation is carried out each 10 seconds for a volume unit flowing through the first polymerization reactor, e) calculating, based on the measured process parameters and the calculated concentrations, the cooling power, the generation of heat, and the concentration of radicals, f) calculating, based on the calculated data of the cooling power, of the generation of heat, and of the concentration of radicals, the probability of a thermal runaway of the reaction mixture at the positions along each of the first polymerization reactor and the second polymerization reactor which have the highest temperatures, and g) outputting an alarm signal if the calculated value for the probability of a thermal runaway in either the first polymerization reactor or second polymerization reactor exceeds a predefined value.

Embodiment 38

The process of embodiment 37, wherein the first polymerization reactor comprises an autoclave reactor and the second polymerization reactor comprises an autoclave reactor.

Embodiment 39

The process of embodiment 37, wherein the first polymerization reactor comprises a tubular reactor and the second polymerization reactor comprises an autoclave reactor.

Embodiment 40

The process of embodiment 37, wherein the first polymerization reactor comprises an autoclave reactor and the second polymerization reactor comprises a tubular reactor.

Definitions

To define more clearly the terms used herein, the following definitions are provided, and unless otherwise indicated or the context requires otherwise, these definitions are applicable throughout this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, when describing a compound or composition "consisting essentially of" is not to be construed as "comprising," but is intended to describe the recited component that includes materials which do not significantly alter composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of, apply only to feature class to which is utilized and it is possible to have different transitional terms or phrases utilized with different features within a claim. For example a method can comprise several recited steps (and other non-recited steps) but utilize a catalyst system preparation consisting of specific steps but utilize a catalyst system comprising recited components and other non-recited components. While compositions and methods are described in terms of "comprising" various components or steps, the compositions and methods can also "consist essentially of" or "consist of" the various components or steps.

The terms "a," "an," and "the" are intended, unless specifically indicated otherwise or the context requires otherwise, to include plural alternatives, e.g., at least one.

"Optional" or "optionally" means that the subsequently described event or circumstance can or cannot occur, and that the description includes instances where the event or circumstance occurs and instances where it does not.

The terms "configured for use" or "adapted for use" and similar language is used herein to reflect that the particular recited structure or procedure is used in an olefin polymerization system or process as disclosed herein. For example, unless otherwise specified, a particular structure "configured for use" means it is "configured for use in an olefin polymerization reactor system" and therefore is designed, shaped, arranged, constructed, and/or tailored to effect an olefin polymerization, as would have been understood by the skilled person.

The term "olefin" is used herein in accordance with the definition specified by IUPAC: acyclic and cyclic hydrocarbons having one or more carbon-carbon double bonds apart from the formal ones in aromatic compounds. The class "olefins" subsumes alkenes and cycloalkenes and the corresponding polyenes. Ethylene, propylene, 1-butene, 2-butene, 1-hexene and the like are non-limiting examples of olefins. The term "alpha olefin" as used in this specification and claims refers to an olefin that has a double bond between the first and second carbon atom of the longest contiguous chain of carbon atoms. The term "alpha olefin" includes linear and branched alpha olefins unless expressly stated otherwise.

The term "similar" when used to modify a reactor means substantially similar in all aspects, including reactor type, reactor size, mass flow rate, temperature, pressure, and other operating parameters to a reference reactor. For example, as used herein, a "similar tubular reactor" means a tubular reactor having a substantially similar size, mass flow rate, temperature, pressure, and other operating parameters to a reference tubular reactor. For example, as used herein, a "similar autoclave reactor" includes an autoclave reactor having a size of from about 90% to about 110% of a reference autoclave reactor, a mass flow rate of from about 90% to about 110% of a reference autoclave reactor, and a temperature, pressure, and other operating parameters of about +/−10% the temperature, pressure, and other operating parameters of a reference autoclave reactor.

When describing a range of measurements such as temperatures, pressures, ratios and the like, it is the Applicant's intent to disclose every individual number that such a range could reasonably encompass, for example, every individual number that has at least one more significant figure than in the disclosed end points of the range. As an example, when referring to a pressure from about 10,000 psi to about 50,000 psi, Applicant's intent is that the disclosure of this range also discloses and is equivalent to the disclosure of about 10,000 psi, about 11,000 psi, about 12,000 psi, about 13,000 psi, about 14,000 psi, about 15,000 psi, about 16,000 psi, and so on, up to and including about 50,000 psi. Applicant's intent is that these two methods of describing the range are interchangeable. Moreover, when a range of values is disclosed or claimed, Applicant also intends for the disclosure of a range to reflect, and be interchangeable with, disclosing any and all sub-ranges and combinations of sub-ranges encompassed therein. Accordingly, Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed herein, and that each value is also herein disclosed as "about" that particular value in addition to the value itself. In aspects, "about" can be used to mean within 10% of the recited value, within 5% of the recited value, within 2% of the recited value, or within 1% of the recited value.

Any headings that are employed herein are not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants reserve the right to proviso out any selection, feature, range, element, or aspect, for example, to limit the scope of any claim to account for a prior disclosure of which Applicants may be unaware.

What is claimed is:

1. A method for the production of a low-density polyethylene polymer in a multi-reactor system comprising:
adding a first ethylene-containing feed stream to a first polymerization reactor;
polymerizing the first ethylene-containing feed stream in the first polymerization reactor in the presence of a first initiator to create a first reactor product stream;
transferring the first reactor product stream from the first polymerization reactor to a second polymerization reactor;
adding a second ethylene-containing feed stream to the second polymerization reactor;
polymerizing the first reactor product stream and the second ethylene-containing feed stream in the presence of a second initiator to produce a second reactor product stream comprising a low-density polyethylene polymer;
wherein the first reactor product stream has a total mass flow that is about 10% to about 80% of the total mass flow of the second reactor product stream.

2. The method of claim 1, wherein at least a portion of the second ethylene-containing feed stream is added to the first reactor product stream before it is added to the second polymerization reactor.

3. The method of claim 1, wherein the first polymerization reactor comprises an autoclave reactor and the second polymerization reactor comprises a tubular reactor.

4. The method of claim 3, wherein the first reactor product stream is transferred from the first autoclave reactor to a second tubular reactor at a temperature sufficient to cause initiation of the polymerization reactor in the second tubular reactor.

5. The method of claim 3, wherein the first reactor product stream is transferred from the first autoclave reactor to a second tubular reactor at a temperature of about 250° F. to about 390° F.

6. The method of claim 3, wherein the overall conversion rate to the low-density polyethylene polymer is improved by at least about 4% to about 21% when compared to the overall conversion rate of a similar tubular reactor, and
wherein the similar tubular reactor has a total mass flow that is at least 90% of the total mass flow of the second reactor product stream.

7. The method of claim 1, wherein the first polymerization reactor comprises an autoclave reactor and the second polymerization reactor comprises an autoclave reactor.

8. The method of claim 7, wherein the first ethylene-containing feed stream is introduced at sufficient velocity to produce turbulent flow within the first polymerization reactor, and wherein polymerizing the first ethylene-containing feed stream in the first autoclave reactor is accomplished without mechanical stirring.

9. The method of claim 1, wherein the first polymerization reactor comprises a tubular reactor and the second polymerization reactor comprises an autoclave reactor.

10. The method of claim 1, wherein the first initiator and the second initiator are the same.

11. The method of claim 1, wherein the first initiator and the second initiator are different.

12. The method of claim 1, wherein the step of polymerizing the first ethylene-containing feed stream in the first polymerization reactor further comprises polymerizing the first ethylene-containing feed stream in the first polymerization reactor in the presence of a chain transfer agent.

13. The method of claim 12, wherein the chain transfer agent is introduced to the first polymerization reactor at more than one location.

14. The method of claim 1, wherein the step of polymerizing the first reactor product stream and the second ethylene-containing feed stream further comprises polymerizing the first reactor product stream and the second ethylene-containing feed stream in the presence of a chain transfer agent.

15. The method of claim 14, wherein the chain transfer agent is introduced to the second autoclave reactor at more than one location.

16. The method of claim 1, wherein the step of polymerizing the first ethylene-containing feed stream in the first polymerization reactor further comprises polymerizing the first ethylene-containing feed stream in the first polymerization reactor in the presence of a first chain transfer agent; and the step of polymerizing the first reactor product stream and the second ethylene-containing feed stream further comprises polymerizing the first reactor product stream and the second ethylene-containing feed stream in the presence of a second chain transfer agent.

17. The method of claim 16, wherein the first chain transfer agent and the second chain transfer agent are different.

18. The method of claim 16, wherein the first chain transfer agent and the second chain transfer agent are the same.

19. The method of claim 1, wherein the first initiator is introduced to the first polymerization reactor at more than one location.

20. The method of claim 1, wherein the second initiator is introduced to the second polymerization reactor at more than one location.

21. The method of claim 1, wherein the pressure within each of the first polymerization reactor and the second polymerization reactor is independently from about 10,000 psi to about 50,000 psi.

22. The method of claim 1, wherein the mass flow of the first reactor product stream is from about 30% to about 50% of the total mass flow of the second reactor product stream.

23. The method of claim 1, wherein the temperature within each of the first polymerization reactor and the second polymerization reactor is independently from about 320° F. to about 600° F.

24. The method of claim 1, wherein the residence time within each of the first polymerization reactor and the second polymerization reactor is independently from about 20 to about 120 seconds.

25. The method of claim 1, further comprising the step of cooling the first reactor product stream before or during transfer from the first polymerization reactor to the second polymerization reactor.

26. The method of claim 1, wherein the second polymerization reactor comprises an autoclave reactor and the overall conversion rate to the low-density polyethylene polymer is improved by at least about 4% to about 40% when compared to the overall conversion rate of a similar autoclave reactor, and
wherein the similar autoclave reactor has a total mass flow that is at least 90% of the total mass flow of the second reactor product stream.

27. A multi-reactor system for the production of low-density polyethylene polymers comprising:
a first polymerization reactor configured to receive a first ethylene-containing feed stream and further configured to polymerize said ethylene-containing feed stream in the presence of a first initiator to create a first reactor product stream;
a second polymerization reactor configured to receive the first reactor product stream and a second ethylene-containing feed stream and further configured to polymerize said first reactor product stream and second ethylene-containing feed stream in the presence of a second initiator to create a second reactor product stream comprising low-density polyethylene polymers;
wherein the first polymerization reactor and the second polymerization reactor are configured such that the first reactor product stream has a total mass flow of from about 10% to about 80% of the total mass flow of the second reactor product stream.

28. The multi-reactor system of claim 27, wherein the first polymerization reactor comprises an autoclave reactor and the second polymerization reactor comprises an autoclave reactor.

29. The multi-reactor system of claim 28, wherein the first autoclave reactor does not contain any mechanical stirring units.

30. The multi-reactor system of claim 28, wherein the second autoclave reactor does not contain any mechanical stirring units.

31. The multi-reactor system of claim 27, wherein the first polymerization reactor comprises a tubular reactor and the second polymerization reactor comprises an autoclave reactor.

32. The multi-reactor system of claim 31, wherein the second autoclave reactor does not contain any mechanical stirring units.

33. The multi-reactor system of claim 27, wherein the first polymerization reactor comprises an autoclave reactor and the second polymerization reactor comprises a tubular reactor.

34. The multi-reactor system of claim 33, wherein the first autoclave reactor does not contain any mechanical stirring units.

35. The multi-reactor system of claim 27, wherein an inner volume of the first polymerization reactor is from about 30% to about 50% of an inner volume of the second polymerization reactor.

36. The multi-reactor system of claim 27, further comprising a cooling unit disposed between the first polymerization reactor and the second polymerization reactor, configured to cool the first reactor product stream.

37. A process for monitoring the polymerization of ethylene or ethylene and comonomers in the presence of a free-radical polymerization initiator at pressures from about 10,000 psi to about 50,000 psi and at temperatures from about 320° F. to about 600° F. in a multi-reactor system, comprising the steps of:
  a) providing a multi-reactor system comprising a first polymerization reactor and a second polymerization reactor, wherein an inner volume of the first polymerization reactor is from about 30% to about 50% of an inner volume of the second polymerization reactor;
  b) measuring as process parameters the temperature profiles and the pressures of reaction mediums and the flow and temperature profiles of cooling mediums along each of the first and second polymerization reactors,
  c) monitoring the feeds of ethylene, free-radical polymerization initiator, chain-transfer agent, and, optionally, comonomer to each of the first and second polymerization reactors,
  d) calculating, based on process parameters and on a model for the polymerization process, concentrations for free-radical polymerization initiator, chain transfer agent, ethylene, and, optionally, comonomers at a sufficient number of positions along each the first polymerization reactor and the second polymerization reactor such that at least one calculation is carried out each 10 seconds for a volume unit flowing through the first polymerization reactor,
  e) calculating, based on the measured process parameters and the calculated concentrations, the cooling power, the generation of heat, and the concentration of radicals,
  f) calculating, based on the calculated data of the cooling power, of the generation of heat, and of the concentration of radicals, the probability of a thermal runaway of the reaction mixture at the positions along each of the first polymerization reactor and the second polymerization reactor which have the highest temperatures, and
  g) outputting an alarm signal or activating an interlock if the calculated value for the probability of a thermal runaway in either the first polymerization reactor or second polymerization reactor exceeds a predefined value.

38. The process of claim 37, wherein the first polymerization reactor comprises an autoclave reactor and the second polymerization reactor comprises an autoclave reactor.

39. The process of claim 37, wherein the first polymerization reactor comprises a tubular reactor and the second polymerization reactor comprises an autoclave reactor.

40. The process of claim 37, wherein the first polymerization reactor comprises an autoclave reactor and the second polymerization reactor comprises a tubular reactor.

* * * * *